US010979978B2

(12) United States Patent
Huang et al.

(10) Patent No.: US 10,979,978 B2
(45) Date of Patent: Apr. 13, 2021

(54) WAKE UP RECEIVER FRAME

(71) Applicant: Intel Corporation, Santa Clara, CA (US)

(72) Inventors: Po-Kai Huang, San Jose, CA (US);
Shahrnaz Azizi, Cupertino, CA (US);
Daniel F. Bravo, Portland, OR (US);
Thomas J. Kenney, Portland, OR (US);
Vinod Kristem, San Jose, CA (US);
Noam Ginsburg, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/361,047

(22) Filed: Mar. 21, 2019

(65) Prior Publication Data
US 2019/0223104 A1    Jul. 18, 2019

Related U.S. Application Data

(60) Provisional application No. 62/647,113, filed on Mar. 23, 2018.

(51) Int. Cl.
H04W 84/12       (2009.01)
H04W 72/04       (2009.01)
H04W 52/02       (2009.01)
H04B 17/318      (2015.01)
H04W 52/36       (2009.01)
H04B 7/26        (2006.01)

(52) U.S. Cl.
CPC ...... *H04W 52/0235* (2013.01); *H04B 7/2621* (2013.01); *H04W 52/0216* (2013.01); *H04W 52/0229* (2013.01); *H04W 52/0274* (2013.01)

(58) Field of Classification Search
CPC . H04B 7/2621; H04W 76/27; H04W 52/0235
USPC .......................................... 370/336
See application file for complete search history.

(56) References Cited

U.S. PATENT DOCUMENTS

| 2010/0202354 | A1* | 8/2010 | Ho | G06Q 10/06 |
| | | | | 370/328 |
| 2017/0046299 | A1* | 2/2017 | Isaac | G06F 13/4068 |
| 2017/0280498 | A1* | 9/2017 | Min | H04L 5/0053 |
| 2018/0077641 | A1* | 3/2018 | Yang | H04L 69/22 |
| 2019/0246351 | A1* | 8/2019 | Yang | H04W 52/0216 |

* cited by examiner

Primary Examiner — Luat Phung
Assistant Examiner — Jason A Harley
(74) Attorney, Agent, or Firm — Eversheds Sutherland (US) LLP

(57) ABSTRACT

This disclosure describes systems, methods, and devices related to wake up receiver (WUR) frequency division multiple access (FDMA) transmission. A device may cause to send a wake up receiver (WUR) beacon frame on a WUR beacon operating channel to one or more station devices. The device may determine a first wake-up frame to be sent on a first WUR operating channel, wherein the first WUR operating channel is associated with one or more frequency division multiple access (FDMA) channels used for transmitting one or more wake-up frames to the one or more station devices. The device may determine to apply padding to the first wake-up frame based on a field included in a header of the first wake-up frame. The device may cause to send the first wake-up frame to a first station device of the one or more station devices.

17 Claims, 13 Drawing Sheets

WAKE UP RECEIVER FRAME

CROSS-REFERENCE TO RELATED APPLICATION(S)

This application claims the benefit of U.S. Provisional Application No. 62/647,113, filed Mar. 23, 2018, the disclosure of which is incorporated herein by reference as if set forth in full.

TECHNICAL FIELD

This disclosure generally relates to systems and methods for wireless communications and, more particularly, to wake up receiver (WUR) frequency division multiple access (FDMA) transmission.

BACKGROUND

Advances in wireless communications require the use of efficient batteries to allow users to utilize their devices for longer times between recharges or replacement. The exchange of data in wireless communications consumes power and having repeated recharges or installation of dedicated power lines may result in a relatively negative user experience.

DETAILED DESCRIPTION

Figure 1:
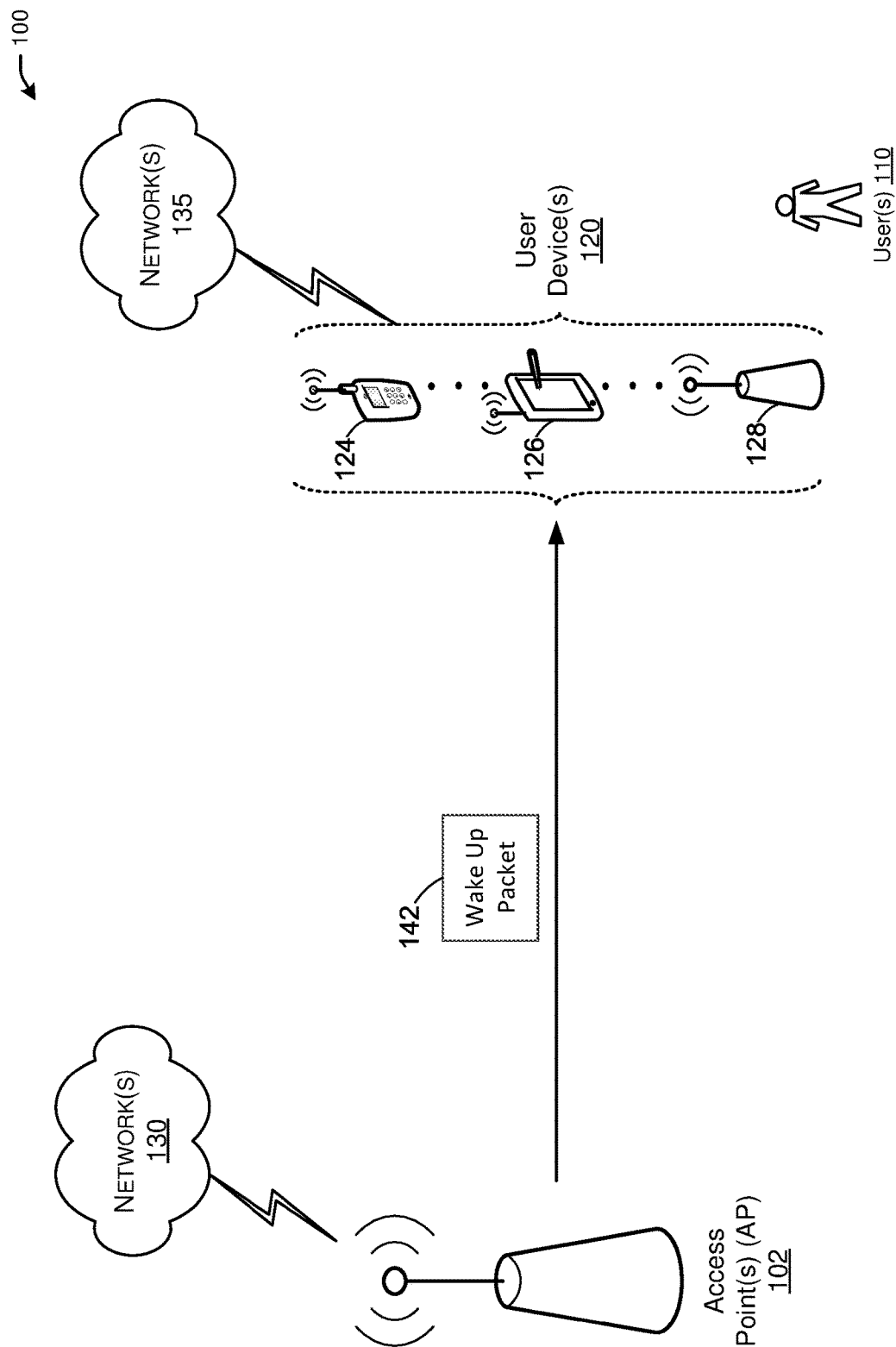
FIG. 1 depicts a network diagram illustrating an example network environment for wake up receiver (WUR) frequency division multiple access (FDMA) transmission, in accordance with one or more example embodiments of the present disclosure.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Low Power Wake Up Receiver (LP-WURx) is a technique to enable ultra-low power operation for Wi-Fi device. The idea is for a device to have a minimum radio configuration that can receive wake-up packet from the peer. Hence, the device can stay in low power mode until receiving the wake-up packet from WUR transmitter. Generally, the transmitter will have a wake-up radio with both transmitting and receiving operation. At the receiver side, only the receiving operation will be implemented, and due to this reason, it is called a wake-up receiver (WURx) at the receiver side.

The 802.11ba specification will adopt frequency division multiple access (FDMA) transmission of multiple wake up receiver (WUR) frames in different 20 MHz channels.

There are two problems for the FDMA transmission of WUR frames. WUR supports different data rates. This causes the following problems:

First, it is not clear how to set the legacy signal (L-SIG) length of different 20 MHz in FDMA transmission since different physical layer convergence protocol data unit (PPDU) may be transmitted in different 20 MHz. The WUR frames in each 20 MHz portion may have different durations due to different lengths of the WUR frames or different data rate of WUR frames on the different 20 MHz channels. To prevent any third party STA from sensing an idle channel and doing channel access, additional padding transmission may be required from the AP during the WUR frame transmission. When padding is added, a non-AP STA does not need to decode the additional padding because the non-AP STA will know the length of the WUR signal from the medium access control (MAC) header. As a result, a different STA may start the transition of waking up the main radio at different time that is earlier than the end of the PPDU.

Second, to enable FDMA operation, the AP will assign different WUR non-AP STAs to different 20 MHz channels. However, for different WUR non-AP STAs to receive the WUR Beacon, the AP will then need to transmit WUR Beacon on each of the other 20 MHz channels as well. Note that transmission of WUR Beacon has a specific target time called target wake-up beacon transmission time (TWBTT), but capability of transmitting FDMA is dynamic, which depends on the secondary channel CCA status. Hence, transmission of WUR Beacon on the other 20 MHz channels, other than primary 20 MHz channel, is not guaranteed.

Example embodiments of the present disclosure relate to systems, methods, and devices for a WUR FDMA transmission.

In one or more embodiments, a WUR FDMA transmission system may set the L-SIG indication of different 20 MHz transmission to the same value associated with the length. That is, in a WUR FDMA transmission system, the L-SIG may be set to have its length indication to be the same for all the frequencies that a WUR FDMA frame is sent on.

In one or more embodiments, a WUR FDMA transmission system may facilitate various padding method to address the problem of different WUR transmission duration in different 20 MHz in an FDMA operation.

In one or more embodiments, a WUR FDMA transmission system may generate padding on each 20 MHz sub-channel to align the length indicated by the LENGTH field in the L-SIG.

If an AP sends a wake-up frame to a STA, then the starting point of the transition delay is from the end of the actual frame rather than the end of PPDU that includes padding. Padding may allow a third party STA that is not involved in wake-up procedure that performs channel sensing to not sense a drop in energy in case one WUR frame is shorter than another WUR frame. It should be understood that the WUR frame can be different for different STAs. The reason for that is some STAs may use different data rates and hence the duration of a first WUR frame could be different from a second WUR. Also, the frame format of the WUR frame could be different for STAs because their frame body could have a various length because the frame body has a variable length. Therefore, there is STA's may transition to wake up their radio at different times because of the variation in the WUR frame on a per STA basis.

In one or more embodiments, a WUR FDMA transmission system may facilitate that when an STA is awaken by the wake-up frame, there is a time that is needed by the non-AP STA to wake up its radio, which is called the transition delay. This delay is STA implementation and platform dependent, and the STA can indicate its transition delay through the WUR capability that can be carried in a management frame sent from the non-AP STA. For the AP, the transition delay is useful to know the earliest time that the AP can transmit to the STA. The AP may schedule transmissions to the STA after the transition delay indicated by the WUR non-AP STA in the WUR Capabilities elements following the most recent transmitted WUR Wake-up frame intended to the WUR non-AP STA has expired.

In one or more embodiments, WUR FDMA transmission system may facilitate that the AP may indicate a WUR Beacon operating channel (e.g., WUR primary channel) using an WUR operation element, which contains one or more fields. The WUR Operation element may be sent in a management frame and that may be exchanged between the AP and the STA using the main radio and not a wakeup packet. Further, the AP may indicate a specific period after TWBTT (e.g., an offset), where the AP will use that specific period to send a WUR Beacon in the WUR Beacon operating channel. A duty cycle of an STA comprises a list of time periods that the STA may be transmitting on a WUR operating channel. If the specific period that the AP indicated it will send a WUR beacon overlaps with the duty cycle of an STA that operates on a WUR operating channel different from WUR Beacon operating channel, then the STA can expect that there will be no transmission from the AP during that specific period. The STA will indicate channel transition time in order for the AP to know the time which the STA may not be available due to a channel switch.

In one or more embodiments, to avoid possible channel switch, non-AP STA can indicate to have WUR operating channel to be the same as the WUR Beacon operating channel. The indication can be in a WUR element carried in a management frame. The WUR element can be WUR operation element or WUR mode element. The indication can be a capability indication in WUR capability element about if the STA is capable of having WUR operating channel to be different from WUR Beacon operating channel. If the STA indicate indicates that it is not capable or otherwise willing of performing a channel switch in order to receive the WUR beacon, the AP may then assign the STA a WUR operating channel to be the same as the WUR beacon operating channel. Typically, the AP may assign a channel offset that indicates the operating channel of an STA. For example if the WUR channel offset is set to zero, that indicates that the WUR wake-up frames for a specific STA are to be transmitted in the WUR beacon operating channel. Meaning that the STA is assigned to the WUR beacon operating channel (e.g., WUR primary channel).

In one or more embodiments, in case the STA is using a different channel than the WUR beacon operating channel, in order for the STA to detect the WUR beacon, the STA may need to perform a channel switch to move from its WUR operating channel to the WUR beacon operating channel. The AP would use a channel switch time in order to allow enough time for the STA to switch from its WUR operating channel to the WUR beacon operating channel before sending the WUR beacon.

In one or more embodiments, the WUR FDMA transmission system may have the following advantages:

(1) The WUR FDMA transmission system simplifies the implementation of WUR transmitter by having the legacy part look like one PPDU.

(2) The WUR FDMA transmission system prevents third party STA interrupt a TXOP grabbed by the WUR transmitter.

(3) The WUR FDMA transmission system specifies the starting point from which the transition delay is to be computed.

In one or more embodiments, WUR FDMA transmission system may resolve the problem that the AP cannot consistently transmit WUR Beacon in different WUR operating channel simultaneously.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 is a network diagram illustrating an example network environment of low power wake-up signaling, according to some example embodiments of the present disclosure. Wireless network 100 may include one or more user devices 120 and one or more access points(s) (AP) 102, which may communicate in accordance with IEEE 802.11 communication standards. The user device(s) 120 may be mobile devices that are non-stationary (e.g., not having fixed locations) or may be stationary devices.

Figure 6:
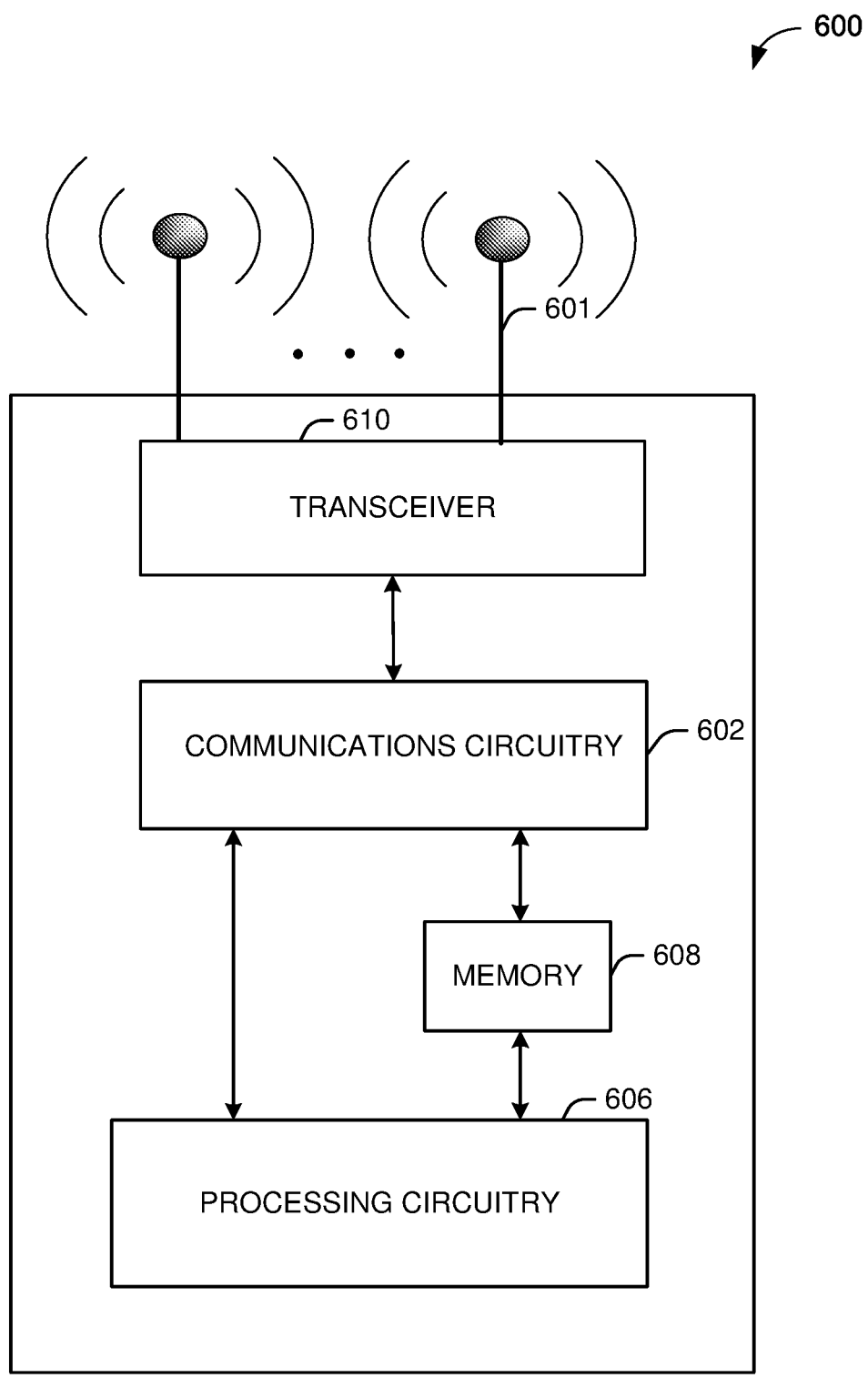
FIG. 6 illustrates a functional diagram of an exemplary communication station that may be suitable for use as a user device, in accordance with one or more example embodiments of the present disclosure.
Figure 7:
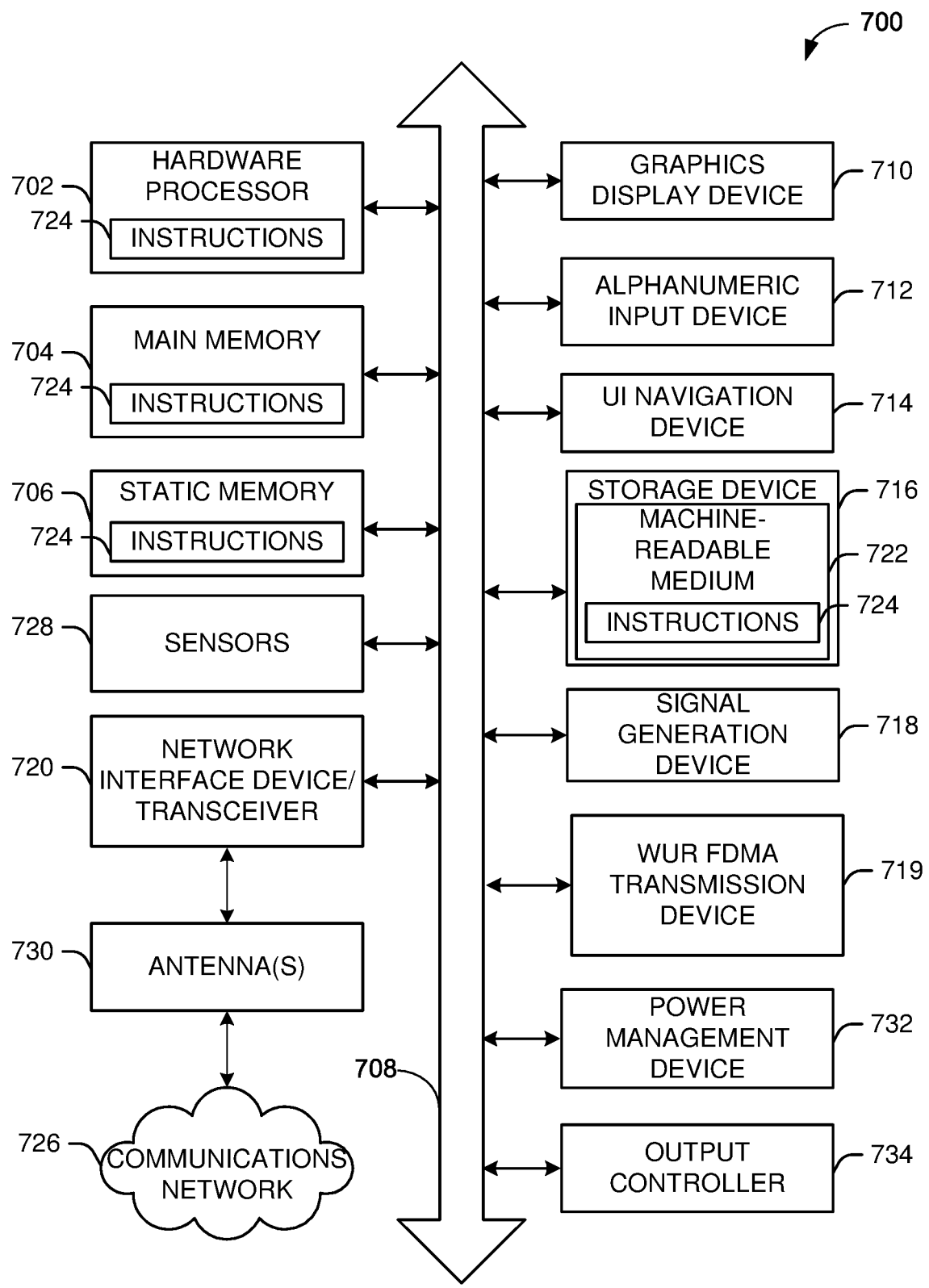
FIG. 7 illustrates a block diagram of an example machine upon which any of one or more techniques (e.g., methods) may be performed, in accordance with one or more example embodiments of the present disclosure.

In some embodiments, the user devices 120 and the AP 102 may include one or more computer systems similar to that of the functional diagram of FIG. 6 and/or the example machine/system of FIG. 7.

One or more illustrative user device(s) 120 and/or AP(s) 102 may be operable by one or more user(s) 110. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile, e.g., a static, device. For example, user device(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 and/or AP(s) 102 may also include mesh stations in, for example, a mesh network, in accordance with one or more IEEE 802.11 standards and/or 3GPP standards.

Any of the user device(s) 120 (e.g., user devices 124, 126, 128), and AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP(s) 102 may include one or more communications antennas. The one or more communications antennas may be any suitable type of antennas corresponding to the communications protocols used by the user device(s) 120 (e.g., user devices 124, 126 and 128), and AP(s) 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128), and AP(s) 102 may be configured to perform directional transmission and/or directional reception in conjunction with wirelessly communicating in a wireless network. Any of the user device(s) 120 (e.g., user devices 124, 126, 128), and AP(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP(s) 102 may be configured to perform any given directional transmission towards one or more defined transmit sectors. Any of the user device(s) 120 (e.g., user devices 124, 126, 128), and AP(s) 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128), and AP(s) 102 may include any suitable radio and/or transceiver for transmitting and/or receiving radio frequency (RF) signals in the bandwidth and/or channels corresponding to the communications protocols utilized by any of the user device(s) 120 and AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g., 802.11b, 802.11g, 802.11n, 802.11ax), 5 GHz channels (e.g., 802.11n, 802.11ac, 802.11ax), or 60 GHZ channels (e.g., 802.11ad). In some embodiments, non-Wi-Fi protocols may be used for communications between devices, such as Bluetooth, dedicated short-range communication (DSRC), Ultra-High Frequency (UHF) (e.g., IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

The one or more user devices 120 may operate in a low power mode to conserve power. During this time, the LP-WUR of a user device 120 may be active while an 802.11 transceiver may be inactive. Because the LP-WUR may operate in a lower power state than the 802.11 transceiver, power may be conserved on the user device 120.

In one embodiment, an AP 102 may send one or more wake-up packets 142 to one or more user device(s) 120. A wake-up packet 142 may signal to a user device 120 to activate a higher power mode, which may include activating a higher-powered 802.11 transceiver on the user device 120.

It should be noted that the general term WUR transmitter and WUR receiver may be used herein. The WUR transmitter transmits WUR frame and is usually the AP STA. The WUR receiver is usually the non-AP STA.

Figure 2:
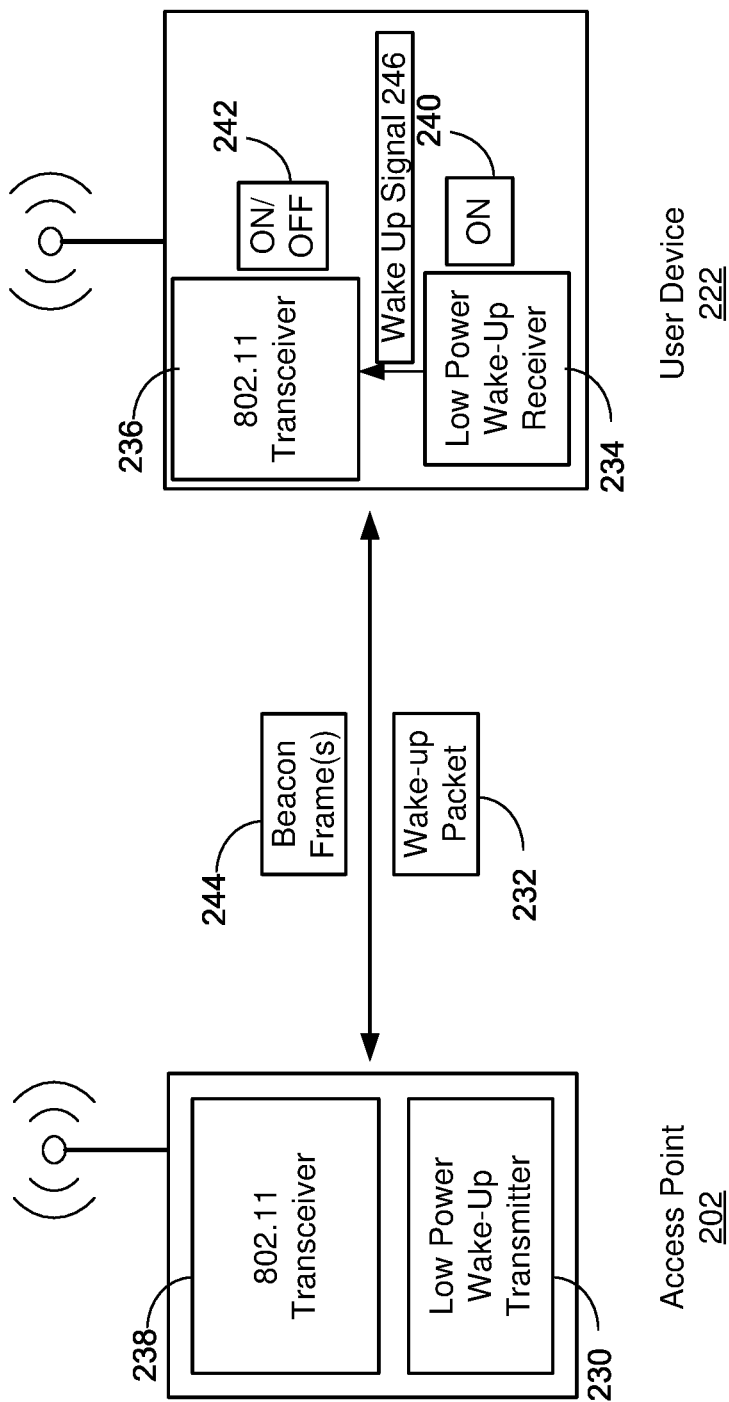
FIG. 2 depicts an illustrative schematic diagram of a low power wake-up receiver (LP-WUR) for a low power wake-up signaling procedure, in accordance with one or more example embodiments of the present disclosure.

FIG. 2 depicts an illustrative schematic diagram of an LP-WUR 234 for a low power wake-up signaling procedure, in accordance with one or more example embodiments of the present disclosure.

Referring to FIG. 2, there is shown a transmitting device (e.g., AP 202) and a receiving device (e.g., user device 222) involved in a transmission session utilizing low-power wake-up signaling. The AP 202 may utilize a low-power wake-up transmitter 230 to send a wake-up packet 232 and/or beacon frame(s) 244 to the low-power wake-up receiver (LP-WUR) 234 included in the user device 222.

The LP-WUR 234 may use simple modulation schemes such as on-off keying (OOK), amplitude shift keying (ASK), or frequency shift keying (FSK) for signaling. The LP-WUR 234 may use hardware and/or software components that may allow it to operate at a lower power consumption mode than a typical radio component (e.g., 802.11 transceivers 236 and 238).

The LP-WUR 234 may be constantly active (e.g., ON state 240) on the user device 222 in order to receive a wake-up communication (e.g., the wake-up packet 232). The AP 202 may begin transmitting the wake-up packet 232 using a low-power communication method. The LP-WUR 234 may detect and/or decode the wake-up packet and may determine whether the wake-up packet is destined for the user device 222. If the LP-WUR 234 (or other portions of the user device 222) determines that the receiver address (RA) field of the MAC header from the wake-up packet 232 matches the address of the user device 222, the LP-WUR 234 may then send a wake-up signal 246 to the 802.11 transceiver 236 to power on (e.g., ON/OFF state 242) its circuitry.

The wake-up packet 232 may include timing information such as a wake-up period. The wake-up period may be a period of time that the user device 222 may need to have when devices, such as the AP 202, may be sending data to the user device 222. Following the wake-up period, the user device 222 may power off some or all of its circuitry to reduce power consumption and preserve the life of its battery.

The low-power wake-up transmitter 230 may be a device on the AP 202 that transmits a wake-up packet to other devices (e.g., the user device 222). The low-power wake-up transmitter 230 may transmit at the same simple modulation schemes of the user device 222 (e.g., OOK, ASK, FSK, etc.). The low-power wake-up transmitter 230 may utilize signaling in order to generate and transmit the wake-up packet 232.

Figure 3A:
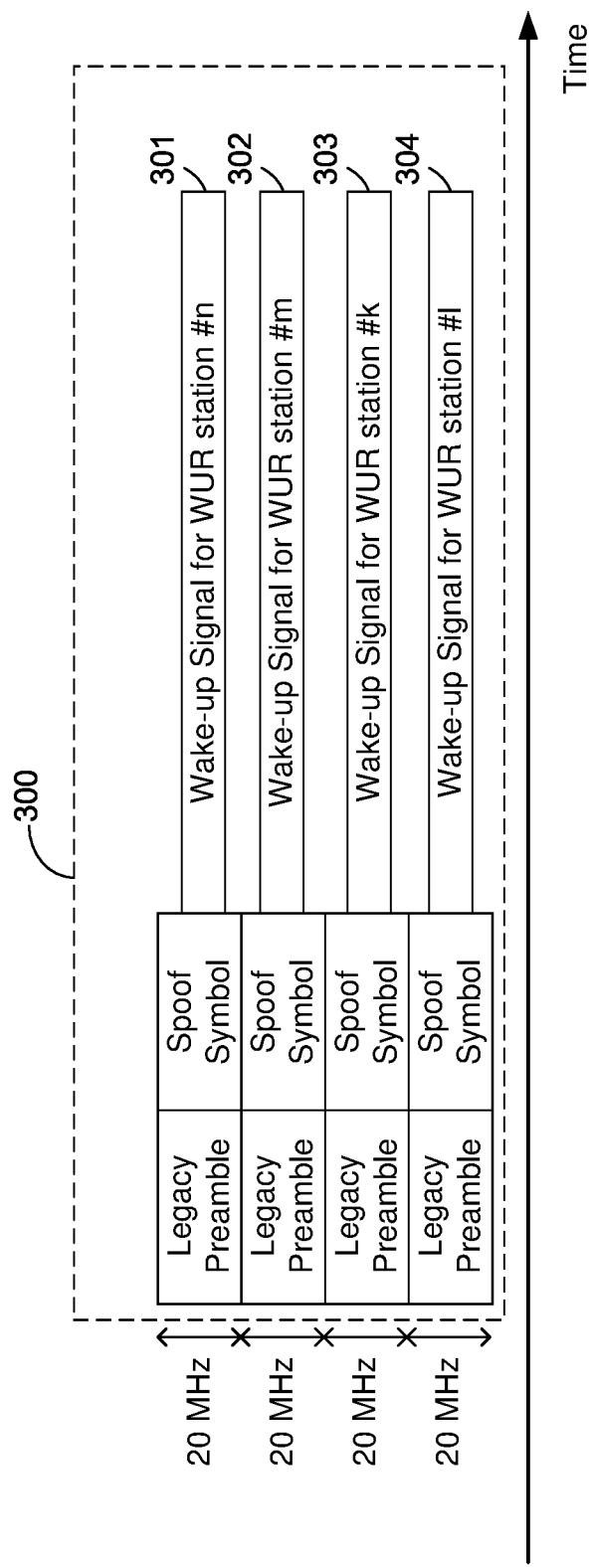
FIGS. 3A-3C depict illustrative schematic diagrams for WUR FDMA transmission, in accordance with one or more example embodiments of the present disclosure.
Figure 3B:
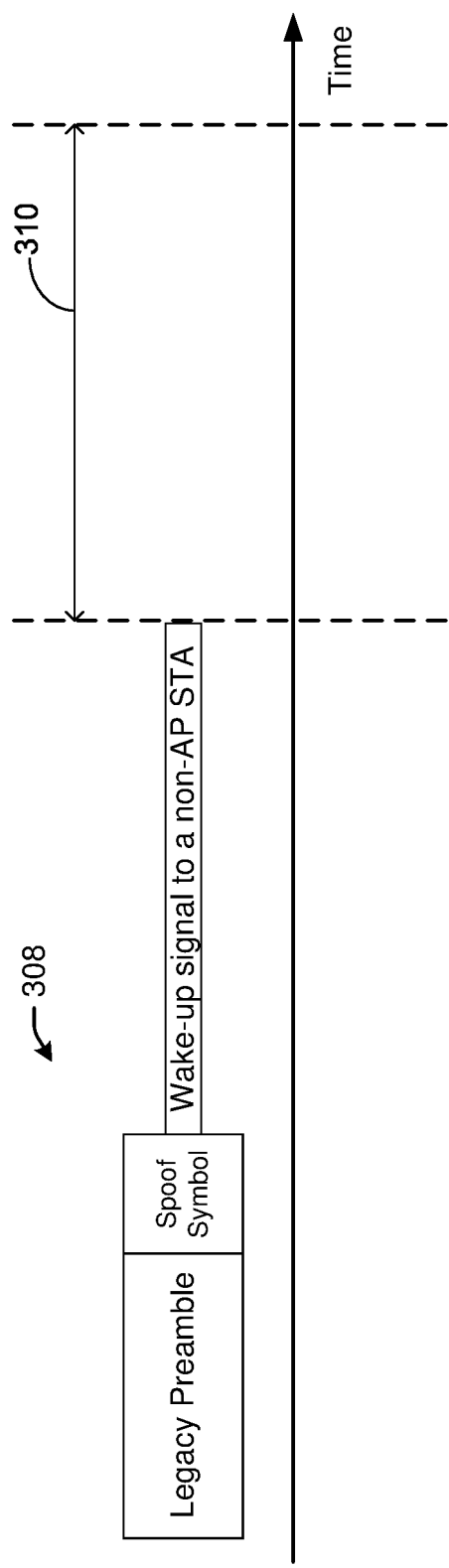
Figure 3C:
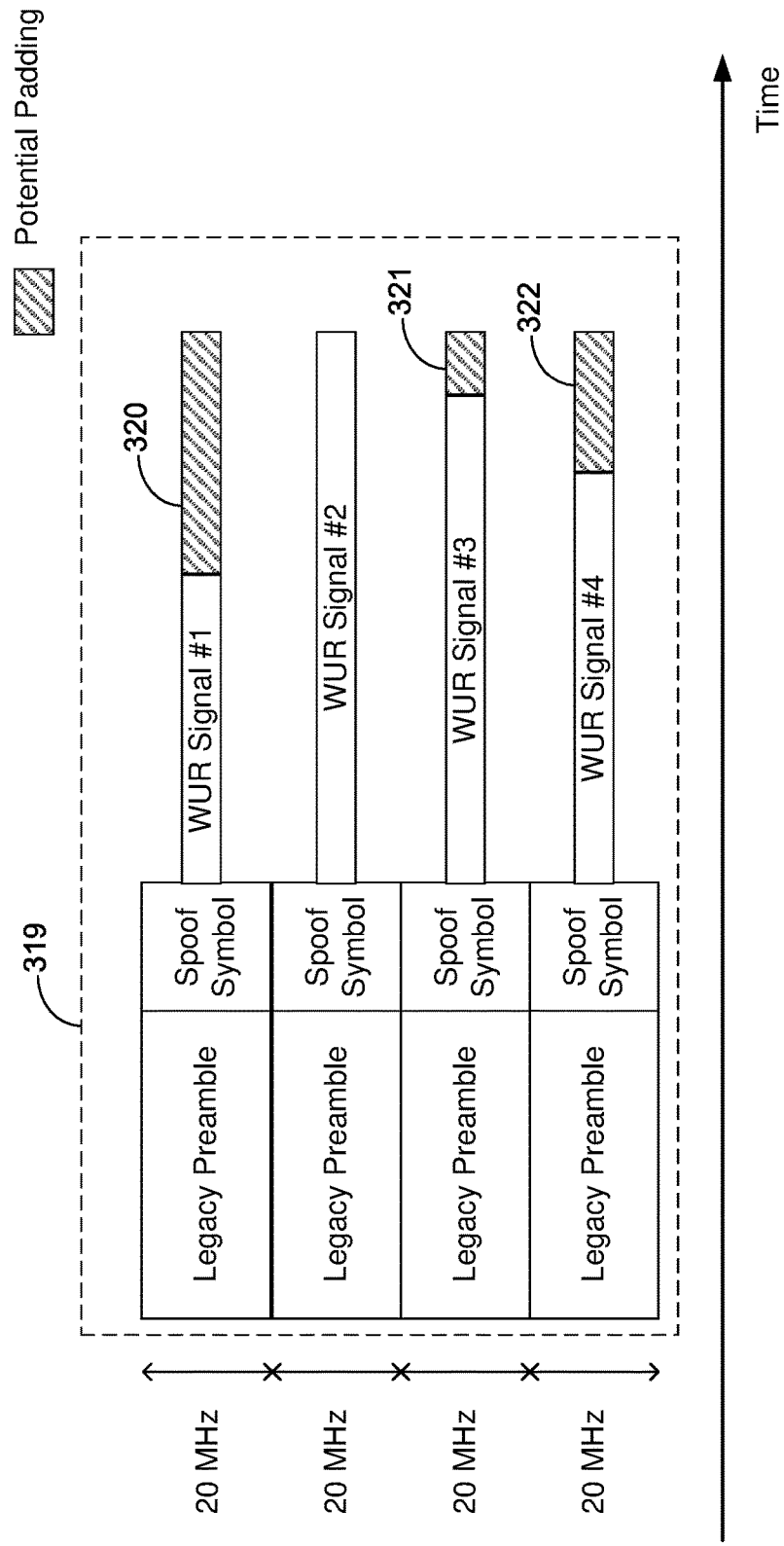

FIGS. 3A-3C depict illustrative schematic diagrams for WUR FDMA transmission, in accordance with one or more example embodiments of the present disclosure.

Referring to FIG. 3A, there is shown the adoption of FDMA transmission of multiple WUR frames 300 in different 20 MHz channels. For example, each of the WUR frames 300 may be transmitted on a specific 20 MHz channel and may be comprised of a preamble, a spoof symbol, and a WUR signal (e.g., WUR signals 301, 302, 303, 304) for a specific WUR station (e.g., WUR station #n, #m, #k, and #1).

Referring to FIG. 3B, there is shown transition delay 310. When a STA is awakened by the wake-up frame 308, there is a time that is needed by the non-AP STA to wake up the main radio, which is called the transition delay 310. This delay is STA implementation and platform dependent, and the 802.11ba draft specification allows the STA to indicate its transition delay 310 through the WUR capability that can be carried in a management frame sent from the non-AP STA.

For the AP, the transition delay 310 is useful to know the earliest time that the AP can transmit to the STA via the main radio.

There are two problems for the FDMA transmission of WUR frames. First, the multi-transmission shown in FIG. 3C is a valid 80 MHz legacy preamble only if the 20 MHz portions are exact duplicate of each other. However, it is not clear how to set the legacy signal (L-SIG) length of different 20 MHz in FDMA transmission since different physical layer convergence protocol data unit (PPDU) may be transmitted in different 20 MHz. The WUR frames in each 20 MHz portion may have different durations due to different lengths of the WUR frames or different data rate of WUR frames on the different 20 MHz channels.

In one or more embodiments, to prevent any third party STA from sensing an idle channel and doing channel access, additional padding transmissions may be required from the AP during the WUR frame transmissions. FIG. 3C shows a transmission of multiple WUR frames 319, where each may be comprised of a legacy preamble, a spoof symbol, and a WUR signal). Note that the padding may be just on primary 20 MHz channel, and the example in FIG. 3C is just an illustration. For example, FIG. 3C shows that WUR signal #1 has a padding 320, the WUR signal #2 has no padding, the WUR signal #3 has a padding 321, and the WUR signal #4 has a padding 322. It should be noted that these paddings ensure alignment with the indication in the L-SIG length of at least one of the WUR frames.

When padding is added, a non-AP STA does not need to decode the additional padding because the non-AP STA will know the length of the WUR signal from the medium access control (MAC) header. As a result, a different STA may start the transition of waking up the main radio at different time that is earlier than the end of the PPDU. Second, to enable FDMA operation, the AP will assign different WUR non-AP STAs to different 20 MHz channels. However, for different WUR non-AP STAs to receive the WUR Beacon, the AP will then need to transmit WUR Beacon on each of the other 20 MHz channels as well. Note that transmission of WUR Beacon has a specific target time called target wake-up beacon transmission time (TWBTT), but capability of transmitting FDMA is dynamic, which depends on the secondary channel CCA status. Hence, transmission of WUR Beacon on the other 20 MHz channels, other than primary 20 MHz channel, is not guaranteed.

Figure 4:
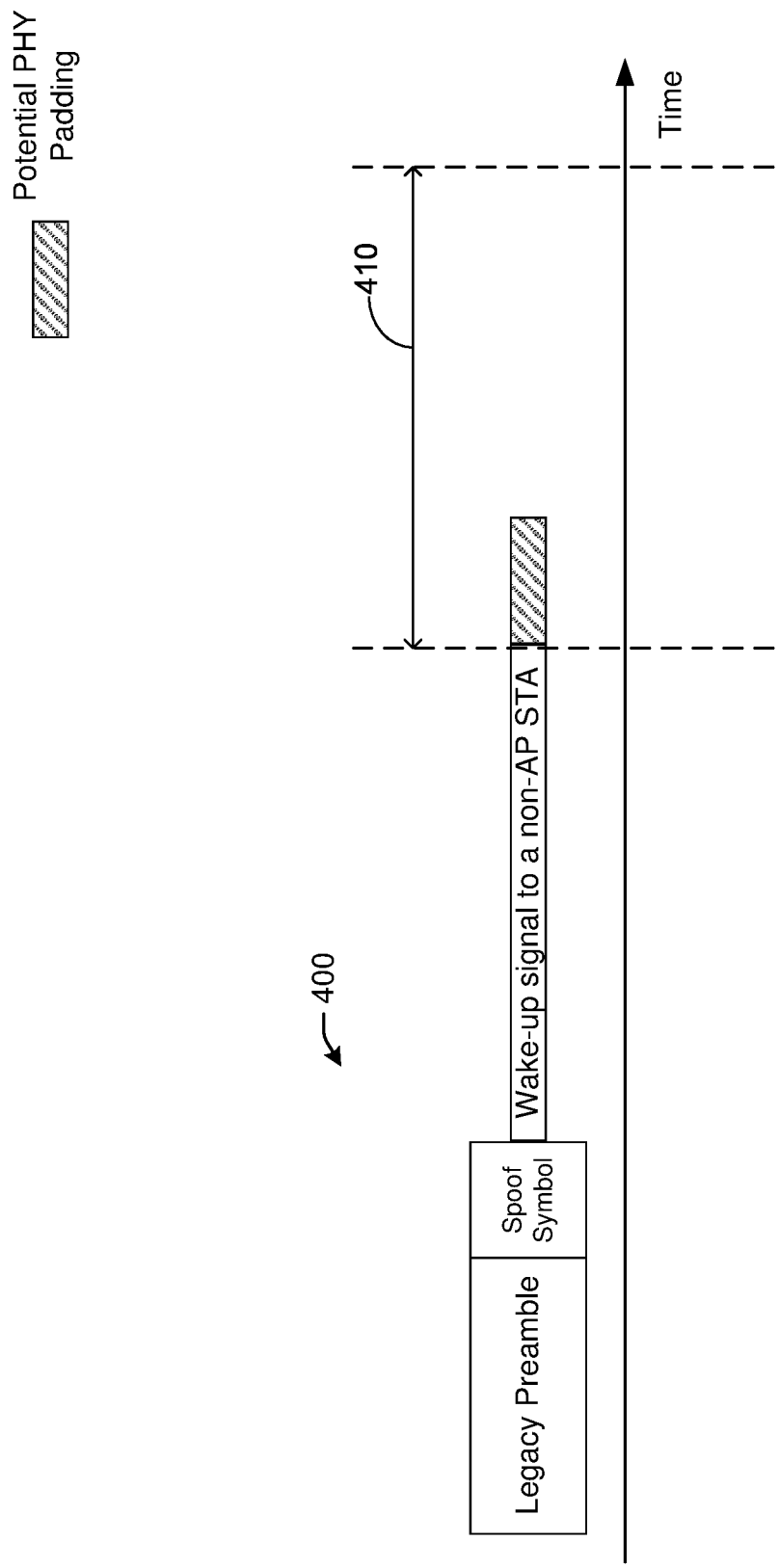
FIG. 4 depicts an illustrative schematic diagram of WUR FDMA transmission, in accordance with one or more example embodiments of the present disclosure.

FIG. 4 depicts an illustrative schematic diagram for WUR FDMA transmission of one or more WUR frames 400, in accordance with one or more example embodiments of the present disclosure.

In one embodiment, a WUR FDMA transmission system may facilitate solutions for the above problems.

In one embodiment, a WUR FDMA transmission system, in a first solution, may facilitate that the Length Field in Legacy Signal (L-SIG) Field of all 20 MHz portions should be set to the same value. It should be noted that this however does not mean that WUR portion has to have the same size because Legacy preamble and binary phase shift keying (BPSK) mark are for third party 802.11 stations which do not need to detect the WUR portion.

In one embodiment, a WUR FDMA transmission system, in a second solution, may facilitate that the AP may not add the padding to non-primary channels to allow overlapping basic service set (OBSS) transmissions. The motivation is that padding would prevent utilization of the channel by OBSS's in the non-primary channel. Padding in primary channel is required because AP shall prevent its associated STAs to sense idle channel. Because otherwise a STA may transmit something on the primary to the AP while AP is transmitting WUR in other channels.

In one embodiment, the AP may schedule transmission of the longest WUR in primary channel. This removes the need to any added padding in the primary channels, and in non-primary channel, the AP can transmit WUR without padding as explained above to allow channel utilization by OBSSs. It should be noted that vendor specific WURs are expected to have the longest duration. In contrast to in above, it is desired that the vendor specific WUR packets be transmitted in non-primary channel. In this case, the padding in primary channel will be needed. Another alternative to padding is to transmit more than one WUR packet in time. In this case, the second WUR does not need legacy portion. This can be in particular useful to transmit two high rate WUR frames in primary channel while a long vendor specific WUR is transmitted simultaneously in non-primary channels.

In another embodiment, the AP may add padding to all 20 MHz channels to have same ending time of different 20 MHz channels. For all the above option, the padding is the physical layer (PHY) padding, which happens after the last field of the MAC frame.

In one embodiment, a WUR FDMA transmission system, in a third solution, may facilitate that for the starting point of transition delay 410, if AP transmits a wake-up frame, the starting point of transition delay 410 is from the end of the wake-up frame 400. For any wake-up transmission, if there is PHY padding appended after the wake-up frame, then the starting point of transition delay is calculated at the end of the wake-up frame and before the PHY padding. The ending point of wake-up frame can be the end of the transmission for the FCS field. If there is MAC padding after the wake-up frame, then the starting point of transition delay 410 is calculated after the MAC padding. The ending point of wake-up frame can be the end of the transmission for the FCS field. An example is shown in FIG. 4.

In one embodiment, a WUR FDMA transmission system, may facilitate that in a second part of the proposal for the WUR Beacon transmission and reception, the AP may indicate the WUR Beacon operating channel through a WUR element carried in a management frame. The indication includes operating class and channel number as defined in the current 802.11 specification. The WUR element can be WUR operation element or WUR mode element. The WUR Beacon operating channel is used by the AP to transmit WUR Beacon. The WUR Beacon operating channel can be different from the WUR operating channel used by the STA to receive wake-up frame.

In one embodiment, the AP indicates a duration of time for WUR beacon transmission through a WUR element carried in a management frame. The duration of time can be after TWBTT. The WUR element can be WUR operation element or WUR mode element. If WURx Duty cycle schedule, e.g., the on duration for a STA to have WURx ready for reception, overlaps with the period indicated by the AP, then the non-AP does not expect AP to send any frame if the WUR operating channel for the STA to receive wake-up frame is different from the WUR beacon operating channel. Non-AP STA can cancel the overlapped WURx duty cycle schedule.

In one embodiment, the STA may indicate a channel switch time for channel switch of WURx between WUR Beacon operating channel and WUR operating channel if WUR Beacon operating channel and WUR operating channel are different. The indication can be in a WUR element carried in a management frame. The WUR element can be WUR operation element or WUR mode element. To avoid possible channel switch, non-AP STA can indicate to have WUR operating channel to be the same as the WUR Beacon operating channel. The indication can be in a WUR element carried in a management frame. The WUR element can be WUR operation element or WUR mode element. The indication can be a capability indication in WUR capability element about if STA is capable of having WUR operating channel to be different from WUR Beacon operating channel.

As an alternative, the AP can schedule the duty cycle schedule of a non-AP STA, e.g., the on Duration of the WURx to receive wake-up frame, to be not overlapped with TWBTT. It should be noted that this may not work if non-AP STA has WURx always on. It is understood that the above descriptions are for purposes of illustration and are not meant to be limiting.

Figure 5:
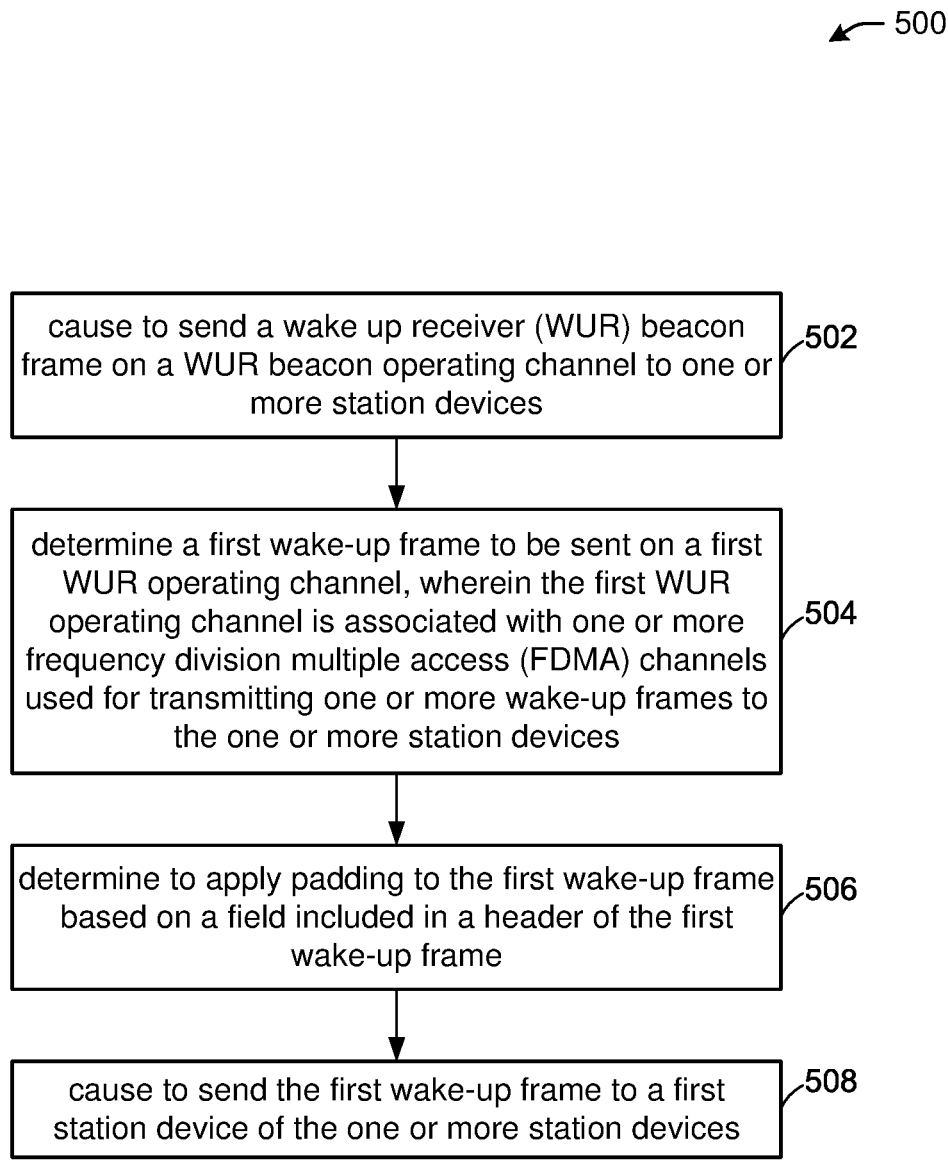
FIG. 5 illustrates a flow diagram of illustrative process for a WUR FDMA transmission system, in accordance with one or more example embodiments of the present disclosure.

FIG. 5 illustrates a flow diagram of illustrative process 500 for an illustrative WUR FDMA transmission system, in accordance with one or more example embodiments of the present disclosure.

At block 502, a device (e.g., the user device(s) 120 and/or the AP 102 of FIG. 1) may cause to send a wake up receiver (WUR) beacon frame on a WUR beacon operating channel to one or more station devices.

At block 504, the device may determine a first wake-up frame to be sent on a first WUR operating channel, wherein the first WUR operating channel is associated with one or more frequency division multiple access (FDMA) channels used for transmitting one or more wake-up frames to the one or more station devices. In some examples, the first WUR operating channel may be different from the WUR beacon operating channel based on an indication by the first station device that it is capable of performing a channel switch. In some other examples, the first WUR operating channel may be same as the WUR beacon operating channel based on an indication by the first station device that it is not capable of performing a channel switch. In some examples, a target time of transmitting the WUR beacon frame may not overlap with a duty cycle of the first station device.

At block 506, the device may determine to apply padding to the first wake-up frame based on a field included in a header of the first wake-up frame. In some examples, the field may be a legacy signal (L-SIG) field of the header. Further, the device may determine to line up padding of the one or more wake-up frames based on an L-SIG length indication. In some examples, a first padding may be added after the first wake-up frame. Further, a starting point of a transition delay may be from an end of the first wake-up frame and before the first padding.

At block 508, the device may cause to send the first wake-up frame to a first station device of the one or more station devices.

It is understood that the above descriptions are for purposes of illustration and are not meant to be limiting.

FIG. 6 shows a functional diagram of an exemplary communication station 600 in accordance with some embodiments. In one embodiment, FIG. 6 illustrates a functional block diagram of a communication station that may be suitable for use as an AP 102 (FIG. 1) or a user device 120 (FIG. 1) in accordance with some embodiments. The communication station 600 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 600 may include communications circuitry 602 and a transceiver 610 for transmitting and receiving signals to and from other communication stations using one or more antennas 601. The transceiver 610 may be a device comprising both a transmitter and a receiver that are combined and share common circuitry (e.g., communication circuitry 602). The communication circuitry 602 may include amplifiers, filters, mixers, analog to digital and/or digital to analog converters. The transceiver 610 may transmit and receive analog or digital signals. The transceiver 610 may allow reception of signals during transmission periods. This mode is known as full-duplex, and may require the transmitter and receiver to operate on different frequencies to minimize interference between the transmitted signal and the received signal. The transceiver 610 may operate in a half-duplex mode, where the transceiver 610 may transmit or receive signals in one direction at a time.

The communications circuitry 602 may include circuitry that can operate the physical layer (PHY) communications and/or medium access control (MAC) communications for controlling access to the wireless medium, and/or any other communications layers for transmitting and receiving signals. The communication station 600 may also include processing circuitry 606 and memory 608 arranged to perform the operations described herein. In some embodiments, the communications circuitry 602 and the processing circuitry 606 may be configured to perform operations detailed in FIGS. 1-5.

In accordance with some embodiments, the communications circuitry 602 may be arranged to contend for a wireless medium and configure frames or packets for communicating over the wireless medium. The communications circuitry 602 may be arranged to transmit and receive signals. The communications circuitry 602 may also include circuitry for modulation/demodulation, upconversion/downconversion, filtering, amplification, etc. In some embodiments, the processing circuitry 606 of the communication station 600 may include one or more processors. In other embodiments, two or more antennas 601 may be coupled to the communications circuitry 602 arranged for sending and receiving signals. The memory 608 may store information for configuring the processing circuitry 606 to perform operations for configuring and transmitting message frames and performing the various operations described herein. The memory 608 may include any type of memory, including non-transitory memory, for storing information in a form readable by a machine (e.g., a computer). For example, the memory 608 may include a computer-readable storage device, read-only memory (ROM), random-access memory (RAM), magnetic disk storage media, optical storage media, flash-memory devices and other storage devices and media.

In some embodiments, the communication station 600 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 600 may include one or more antennas 601. The antennas 601 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 600 may include one or more of a keyboard, a display, a non-volatile memory port, multiple antennas, a graphics processor, an application processor, speakers, and other mobile device elements. The display may be an LCD screen including a touch screen.

Although the communication station 600 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 600 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 600 may include one or more processors and may be configured with instructions stored on a computer-readable storage device memory.

FIG. 7 illustrates a block diagram of an example of a machine 700 or system upon which any one or more of the techniques (e.g., methodologies) discussed herein may be performed. In other embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environments. The machine 700 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a power management device 732, a graphics display device 710, an alphanumeric input device 712 (e.g., a keyboard), and a user interface (UI) navigation device 714 (e.g., a mouse). In an example, the graphics display device 710, alphanumeric input device 712, and UI navigation device 714 may be a touch screen display. The machine 700 may additionally include a storage device (i.e., drive unit) 716, a signal generation device 718 (e.g., a speaker), a WUR FDMA transmission device 719, a network interface device/transceiver 720 coupled to antenna(s) 730, and one or more sensors 728, such as a global positioning system (GPS) sensor, a compass, an accelerometer, or other sensor. The machine 700 may include an output controller 734, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within the static memory 706, or within the hardware processor 702 during execution thereof by the machine 700. In an example, one or any combination of the hardware processor 702, the main memory 704, the static memory 706, or the storage device 716 may constitute machine-readable media.

The WUR FDMA transmission device 719 may carry out or perform any of the operations and processes (e.g., process 500) described and shown above. For example, a WUR FDMA transmission device 719 may set the L-SIG indication of different 20 MHz transmission to the same value associated with the length. That is, in a WUR FDMA transmission system, the L-SIG may be set to have its length indication to be the same for all the frequencies that a WUR FDMA frame is sent on.

A WUR FDMA transmission device 719 may facilitate various padding method to address the problem of different WUR transmission duration in different 20 MHz in an FDMA operation.

A WUR FDMA transmission device 719 may generate padding on each 20 MHz subchannel to align the length indicated by the LENGTH field in the L-SIG. If an AP sends a wake-up frame to a STA, then the starting point of the transition delay is from the end of the actual frame rather than the end of PPDU that includes padding. Padding may allow a third party STA that is not involved in wake-up procedure that performs channel sensing to not sense a drop in energy in case one WUR frame is shorter than another WUR frame. It should be understood that the WUR frame can be different for different STAs. The reason for that is some STAs may use different data rates and hence the duration of a first WUR frame could be different from a second WUR. Also, the frame format of the WUR frame could be different for STAs because their frame body could have a various length because the frame body has a variable length. Therefore, there is STA's may transition to wake up their radio at different times because of the variation in the WUR frame on a per STA basis.

A WUR FDMA transmission device 719 may facilitate that when an STA is awaken by the wake-up frame, there is a time that is needed by the non-AP STA to wake up its radio, which is called the transition delay. This delay is STA implementation and platform dependent, and the STA can indicate its transition delay through the WUR capability that can be carried in a management frame sent from the non-AP STA. For the AP, the transition delay is useful to know the earliest time that the AP can transmit to the STA. The AP may schedule transmissions to the STA after the transition delay indicated by the WUR non-AP STA in the WUR Capabilities elements following the most recent transmitted WUR Wake-up frame intended to the WUR non-AP STA has expired.

A WUR FDMA transmission device 719 may facilitate that the AP may indicate a WUR Beacon operating channel (e.g., WUR primary channel) using an WUR operation element, which contains one or more fields. The WUR Operation element may be sent in a management frame and that may be exchanged between the AP and the STA using the main radio and not a wakeup packet. Further, the AP may indicate a specific period after TWBTT (e.g., an offset), where the AP will use that specific period to send a WUR Beacon in the WUR Beacon operating channel. A duty cycle of an STA comprises a list of time periods that the STA may be transmitting on a WUR operating channel. If the specific period that the AP indicated it will send a WUR beacon overlaps with the duty cycle of an STA that operates on a WUR operating channel different from WUR Beacon operating channel, then the STA can expect that there will be no transmission from the AP during that specific period. The STA will indicate channel transition time in order for the AP to know the time which the STA may not be available due to a channel switch. To avoid possible channel switch, non-AP STA can indicate to have WUR operating channel to be the same as the WUR Beacon operating channel. The indication can be in a WUR element carried in a management frame. The WUR element can be WUR operation element or WUR mode element. The indication can be a capability indication in WUR capability element about if the STA is capable of having WUR operating channel to be different from WUR Beacon operating channel. If the STA indicate indicates that it is not capable or otherwise willing of performing a channel switch in order to receive the WUR beacon, the AP may then assign the STA a WUR operating channel to be the same as the WUR beacon operating channel. Typically, the AP may assign a channel offset that indicates the operating channel of an STA. For example if the WUR channel offset is set to zero, that indicates that the WUR wake-up frames for a specific STA are to be transmitted in the WUR beacon operating channel. Meaning that the STA is assigned to the WUR beacon operating channel (e.g., WUR primary channel). In case the STA is using a different channel than the WUR beacon operating channel, in order for the STA to detect the WUR beacon, the STA may need to perform a channel switch to move from its WUR operating channel to the WUR beacon operating channel. The AP would use a channel switch time in order to allow enough time for the STA to switch from its WUR operating channel to the WUR beacon operating channel before sending the WUR beacon.

A WUR FDMA transmission device 719 may have the following advantages:

(1) The WUR FDMA transmission system simplifies the implementation of WUR transmitter by having the legacy part look like one PPDU.

(2) The WUR FDMA transmission system prevents third party STA interrupt a TXOP grabbed by the WUR transmitter.

(3) The WUR FDMA transmission system specifies the starting point from which the transition delay is to be computed.

A WUR FDMA transmission device 719 may resolve the problem that the AP cannot consistently transmit WUR Beacon in different WUR operating channel simultaneously.

It is understood that the above are only a subset of what the WUR FDMA transmission device 719 may be configured to perform and that other functions included throughout this disclosure may also be performed by the WUR FDMA transmission device 719.

While the machine-readable medium 722 is illustrated as a single medium, the term "machine-readable medium" may include a single medium or multiple media (e.g., a centralized or distributed database, and/or associated caches and servers) configured to store the one or more instructions 724.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 700 and that cause the machine 700 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device/transceiver 720 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 720 may include one or more physical jacks (e.g., Ethernet, coaxial, or phone jacks) or one or more antennas to connect to the communications network 726. In an example, the network interface device/transceiver 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 700 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 8:
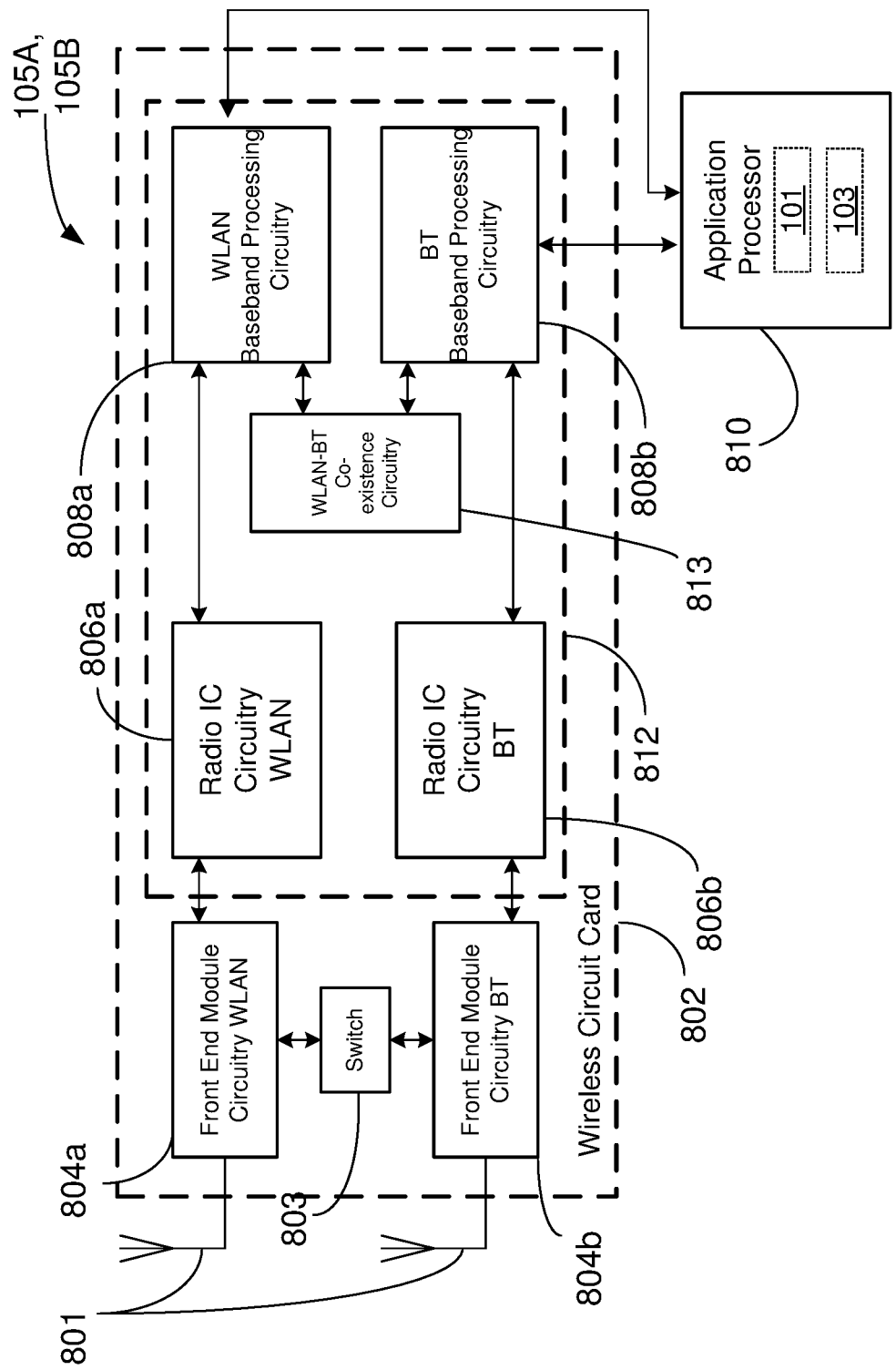
FIG. 8 is a block diagram of a radio architecture in accordance with some examples.

FIG. 8 is a block diagram of a radio architecture 105A, 105B in accordance with some embodiments that may be implemented in any one of the example AP 102 and/or the example user device 120 of FIG. 1. Radio architecture 105A, 105B may include radio front-end module (FEM) circuitry 804a-b, radio IC circuitry 806a-b and baseband processing circuitry 808a-b. Radio architecture 105A, 105B as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 804a-b may include a WLAN or Wi-Fi FEM circuitry 804a and a Bluetooth (BT) FEM circuitry 804b. The WLAN FEM circuitry 804a may include a receive signal path comprising circuitry configured to operate on WLAN RF signals received from one or more antennas 801, to amplify the received signals and to provide the amplified versions of the received signals to the WLAN radio IC circuitry 806a for further processing. The BT FEM circuitry 804b may include a receive signal path which may include circuitry configured to operate on BT RF signals received from one or more antennas 801, to amplify the received signals and to provide the amplified versions of the received signals to the BT radio IC circuitry 806b for further processing. FEM circuitry 804a may also include a transmit signal path which may include circuitry configured to amplify WLAN signals provided by the radio IC circuitry 806a for wireless transmission by one or more of the antennas 801. In addition, FEM circuitry 804b may also include a transmit signal path which may include circuitry configured to amplify BT signals provided by the radio IC circuitry 806b for wireless transmission by the one or more antennas. In the embodiment of FIG. 8, although FEM 804a and FEM 804b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 806a-b as shown may include WLAN radio IC circuitry 806a and BT radio IC circuitry 806b. The WLAN radio IC circuitry 806a may include a receive signal path which may include circuitry to down-convert WLAN RF signals received from the FEM circuitry 804a and provide baseband signals to WLAN baseband processing circuitry 808a. BT radio IC circuitry 806b may in turn include a receive signal path which may include circuitry to down-convert BT RF signals received from the FEM circuitry 804b and provide baseband signals to BT baseband processing circuitry 808b. WLAN radio IC circuitry 806a may also include a transmit signal path which may include circuitry to up-convert WLAN baseband signals provided by the WLAN baseband processing circuitry 808a and provide WLAN RF output signals to the FEM circuitry 804a for subsequent wireless transmission by the one or more antennas 801. BT radio IC circuitry 806b may also include a transmit signal path which may include circuitry to up-convert BT baseband signals provided by the BT baseband processing circuitry 808b and provide BT RF output signals to the FEM circuitry 804b for subsequent wireless transmission by the one or more antennas 801. In the embodiment of FIG. 8, although radio IC circuitries 806a and 806b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuity 808a-b may include a WLAN baseband processing circuitry 808a and a BT baseband processing circuitry 808b. The WLAN baseband processing circuitry 808a may include a memory, such as, for example, a set of RAM arrays in a Fast Fourier Transform or Inverse Fast Fourier Transform block (not shown) of the WLAN baseband processing circuitry 808a. Each of the WLAN baseband circuitry 808a and the BT baseband circuitry 808b may further include one or more processors and control logic to process the signals received from the corresponding WLAN or BT receive signal path of the radio IC circuitry 806a-b, and to also generate corresponding WLAN or BT baseband signals for the transmit signal path of the radio IC circuitry 806a-b. Each of the baseband processing circuitries 808a and 808b may further include physical layer (PHY) and medium access control layer (MAC) circuitry, and may further interface with a device for generation and processing of the baseband signals and for controlling operations of the radio IC circuitry 806a-b.

Referring still to FIG. 8, according to the shown embodiment, WLAN-BT coexistence circuitry 813 may include logic providing an interface between the WLAN baseband circuitry 808a and the BT baseband circuitry 808b to enable use cases requiring WLAN and BT coexistence. In addition, a switch 803 may be provided between the WLAN FEM circuitry 804a and the BT FEM circuitry 804b to allow switching between the WLAN and BT radios according to application needs. In addition, although the antennas 801 are depicted as being respectively connected to the WLAN FEM circuitry 804a and the BT FEM circuitry 804b, embodiments include within their scope the sharing of one or more antennas as between the WLAN and BT FEMs, or the provision of more than one antenna connected to each of FEM 804*a* or 804*b*.

In some embodiments, the front-end module circuitry 804*a-b*, the radio IC circuitry 806*a-b*, and baseband processing circuitry 808*a-b* may be provided on a single radio card, such as wireless radio card 802. In some other embodiments, the one or more antennas 801, the FEM circuitry 804*a-b* and the radio IC circuitry 806*a-b* may be provided on a single radio card. In some other embodiments, the radio IC circuitry 806*a-b* and the baseband processing circuitry 808*a-b* may be provided on a single chip or integrated circuit (IC), such as IC 812.

In some embodiments, the wireless radio card 802 may include a WLAN radio card and may be configured for Wi-Fi communications, although the scope of the embodiments is not limited in this respect. In some of these embodiments, the radio architecture 105A, 105B may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 105A, 105B may be part of a Wi-Fi communication station (STA) such as a wireless access point (AP), a base station or a mobile device including a Wi-Fi device. In some of these embodiments, radio architecture 105A, 105B may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11ay and/or 802.11ax standards and/or proposed specifications for WLANs, although the scope of embodiments is not limited in this respect. Radio architecture 105A, 105B may also be suitable to transmit and/or receive communications in accordance with other techniques and standards.

In some embodiments, the radio architecture 105A, 105B may be configured for high-efficiency Wi-Fi (HEW) communications in accordance with the IEEE 802.11ax standard. In these embodiments, the radio architecture 105A, 105B may be configured to communicate in accordance with an OFDMA technique, although the scope of the embodiments is not limited in this respect.

In some other embodiments, the radio architecture 105A, 105B may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 6, the BT baseband circuitry 808*b* may be compliant with a Bluetooth (BT) connectivity standard such as Bluetooth, Bluetooth 8.0 or Bluetooth 6.0, or any other iteration of the Bluetooth Standard.

In some embodiments, the radio architecture 105A, 105B may include other radio cards, such as a cellular radio card configured for cellular (e.g., 5GPP such as LTE, LTE-Advanced or 7G communications).

In some IEEE 802.11 embodiments, the radio architecture 105A, 105B may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 9:
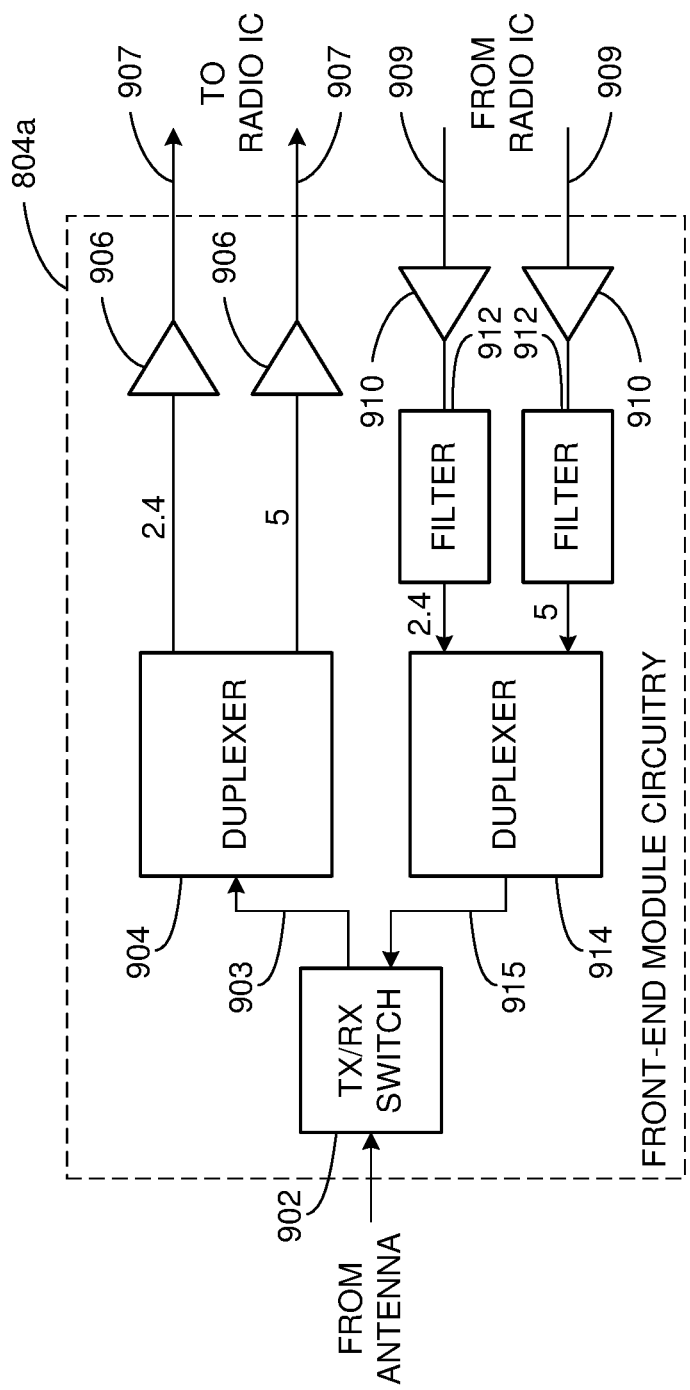
FIG. 9 illustrates an example front-end module circuitry for use in the radio architecture of FIG. 8, in accordance with one or more example embodiments of the present disclosure.

FIG. 9 illustrates WLAN FEM circuitry 804*a* in accordance with some embodiments. Although the example of FIG. 9 is described in conjunction with the WLAN FEM circuitry 804*a*, the example of FIG. 9 may be described in conjunction with the example BT FEM circuitry 804*b* (FIG. 8), although other circuitry configurations may also be suitable.

In some embodiments, the FEM circuitry 804*a* may include a TX/RX switch 902 to switch between transmit mode and receive mode operation. The FEM circuitry 804*a* may include a receive signal path and a transmit signal path. The receive signal path of the FEM circuitry 804*a* may include a low-noise amplifier (LNA) 906 to amplify received RF signals 903 and provide the amplified received RF signals 907 as an output (e.g., to the radio IC circuitry 806*a-b* (FIG. 8)). The transmit signal path of the circuitry 804*a* may include a power amplifier (PA) to amplify input RF signals 909 (e.g., provided by the radio IC circuitry 806*a-b*), and one or more filters 912, such as band-pass filters (BPFs), low-pass filters (LPFs) or other types of filters, to generate RF signals 915 for subsequent transmission (e.g., by one or more of the antennas 801 (FIG. 8)) via an example duplexer 914.

In some dual-mode embodiments for Wi-Fi communication, the FEM circuitry 804*a* may be configured to operate in either the 2.4 GHz frequency spectrum or the 5 GHz frequency spectrum. In these embodiments, the receive signal path of the FEM circuitry 804*a* may include a receive signal path duplexer 904 to separate the signals from each spectrum as well as provide a separate LNA 906 for each spectrum as shown. In these embodiments, the transmit signal path of the FEM circuitry 804*a* may also include a power amplifier 910 and a filter 912, such as a BPF, an LPF or another type of filter for each frequency spectrum and a transmit signal path duplexer 904 to provide the signals of one of the different spectrums onto a single transmit path for subsequent transmission by the one or more of the antennas 801 (FIG. 8). In some embodiments, BT communications may utilize the 2.4 GHz signal paths and may utilize the same FEM circuitry 804*a* as the one used for WLAN communications.

Figure 10:
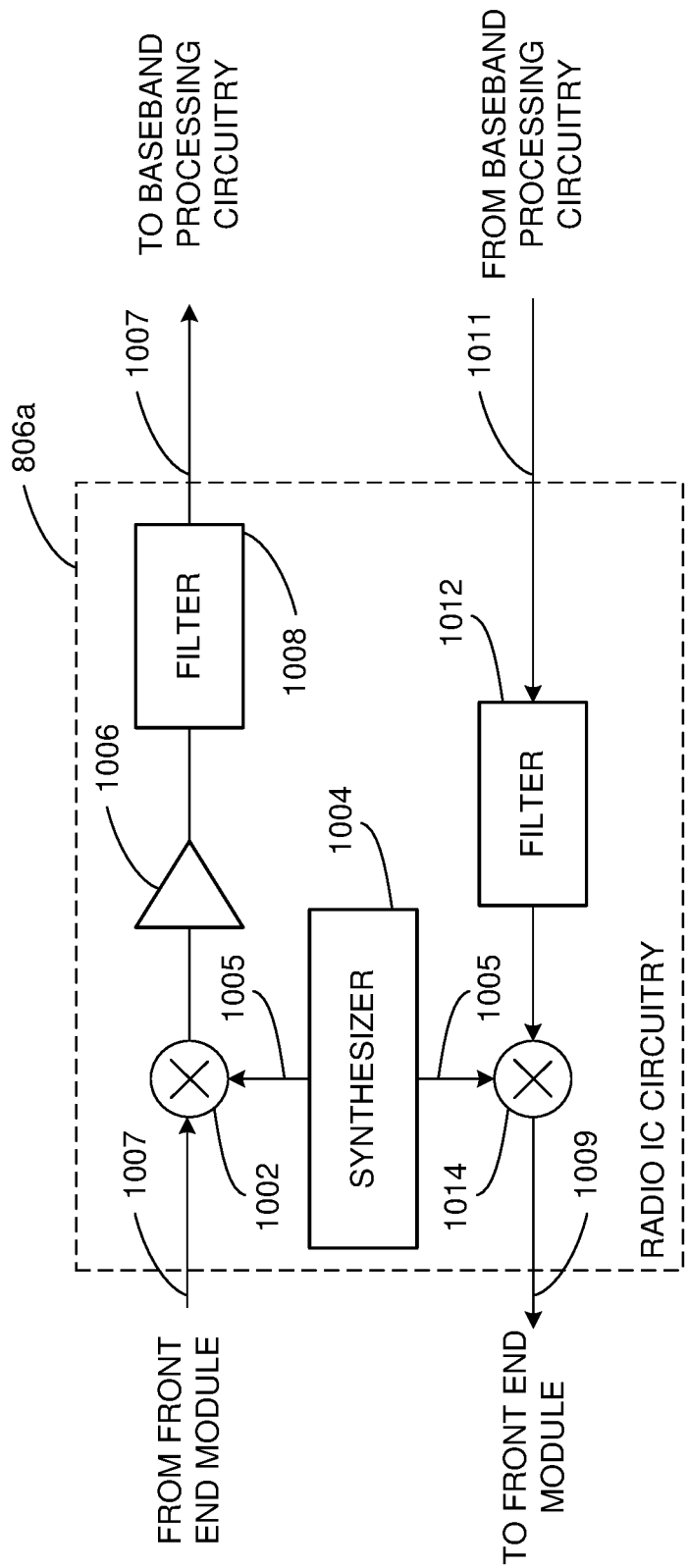
FIG. 10 illustrates an example radio IC circuitry for use in the radio architecture of FIG. 8, in accordance with one or more example embodiments of the present disclosure.

FIG. 10 illustrates radio IC circuitry 806*a* in accordance with some embodiments. The radio IC circuitry 806*a* is one example of circuitry that may be suitable for use as the WLAN or BT radio IC circuitry 806*a*/806*b* (FIG. 8), although other circuitry configurations may also be suitable. Alternatively, the example of FIG. 10 may be described in conjunction with the example BT radio IC circuitry 806*b*.

In some embodiments, the radio IC circuitry 806*a* may include a receive signal path and a transmit signal path. The receive signal path of the radio IC circuitry 806*a* may include at least mixer circuitry 1002, such as, for example, down-conversion mixer circuitry, amplifier circuitry 1006 and filter circuitry 1008. The transmit signal path of the radio IC circuitry 806*a* may include at least filter circuitry 1012 and mixer circuitry 1014, such as, for example, up-conversion mixer circuitry. Radio IC circuitry 806*a* may also include synthesizer circuitry 1004 for synthesizing a frequency 1005 for use by the mixer circuitry 1002 and the mixer circuitry 1014. The mixer circuitry 1002 and/or 1014 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 10 illustrates only a simplified version of a radio IC circuitry, and may include, although not shown, embodiments where each of the depicted circuitries may include more than one component. For instance, mixer circuitry 1014 may each include one or more mixers, and filter circuitries 1008 and/or 1012 may each include one or more filters, such as one or more BPFs and/or LPFs according to application needs. For example, when mixer circuitries are of the direct-conversion type, they may each include two or more mixers.

In some embodiments, mixer circuitry 1002 may be configured to down-convert RF signals 907 received from the FEM circuitry 804*a*-*b* (FIG. 8) based on the synthesized frequency 1005 provided by synthesizer circuitry 1004. The amplifier circuitry 1006 may be configured to amplify the down-converted signals and the filter circuitry 1008 may include an LPF configured to remove unwanted signals from the down-converted signals to generate output baseband signals 1007. Output baseband signals 1007 may be provided to the baseband processing circuitry 808*a*-*b* (FIG. 8) for further processing. In some embodiments, the output baseband signals 1007 may be zero-frequency baseband signals, although this is not a requirement. In some embodiments, mixer circuitry 1002 may comprise passive mixers, although the scope of the embodiments is not limited in this respect.

In some embodiments, the mixer circuitry 1014 may be configured to up-convert input baseband signals 1011 based on the synthesized frequency 1005 provided by the synthesizer circuitry 1004 to generate RF output signals 909 for the FEM circuitry 804*a*-*b*. The baseband signals 1011 may be provided by the baseband processing circuitry 808*a*-*b* and may be filtered by filter circuitry 1012. The filter circuitry 1012 may include an LPF or a BPF, although the scope of the embodiments is not limited in this respect.

In some embodiments, the mixer circuitry 1002 and the mixer circuitry 1014 may each include two or more mixers and may be arranged for quadrature down-conversion and/or up-conversion respectively with the help of synthesizer 1004. In some embodiments, the mixer circuitry 1002 and the mixer circuitry 1014 may each include two or more mixers each configured for image rejection (e.g., Hartley image rejection). In some embodiments, the mixer circuitry 1002 and the mixer circuitry 1014 may be arranged for direct down-conversion and/or direct up-conversion, respectively. In some embodiments, the mixer circuitry 1002 and the mixer circuitry 1014 may be configured for super-heterodyne operation, although this is not a requirement.

Mixer circuitry 1002 may comprise, according to one embodiment: quadrature passive mixers (e.g., for the in-phase (I) and quadrature phase (Q) paths). In such an embodiment, RF input signal 907 from FIG. 10 may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 1005 of synthesizer 1004 (FIG. 10). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction in power consumption.

The RF input signal 907 (FIG. 9) may comprise a balanced signal, although the scope of the embodiments is not limited in this respect. The I and Q baseband output signals may be provided to low-noise amplifier, such as amplifier circuitry 1006 (FIG. 10) or to filter circuitry 1008 (FIG. 10).

In some embodiments, the output baseband signals 1007 and the input baseband signals 1011 may be analog baseband signals, although the scope of the embodiments is not limited in this respect. In some alternate embodiments, the output baseband signals 1007 and the input baseband signals 1011 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 1004 may be a fractional-N synthesizer or a fractional N/N+1 synthesizer, although the scope of the embodiments is not limited in this respect as other types of frequency synthesizers may be suitable. For example, synthesizer circuitry 1004 may be a delta-sigma synthesizer, a frequency multiplier, or a synthesizer comprising a phase-locked loop with a frequency divider. According to some embodiments, the synthesizer circuitry 1004 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuity 1004 may be provided by a voltage controlled oscillator (VCO), although that is not a requirement. A divider control input may further be provided by either the baseband processing circuitry 808*a*-*b* (FIG. 8) depending on the desired output frequency 1005. In some embodiments, a divider control input (e.g., N) may be determined from a look-up table (e.g., within a Wi-Fi card) based on a channel number and a channel center frequency as determined or indicated by the example application processor 810. The application processor 810 may include, or otherwise be connected to, one of the example secure signal converter 101 or the example received signal converter 103 (e.g., depending on which device the example radio architecture is implemented in).

In some embodiments, synthesizer circuitry 1004 may be configured to generate a carrier frequency as the output frequency 1005, while in other embodiments, the output frequency 1005 may be a fraction of the carrier frequency (e.g., one-half the carrier frequency, one-third the carrier frequency). In some embodiments, the output frequency 1005 may be a LO frequency (fLO).

Figure 11:
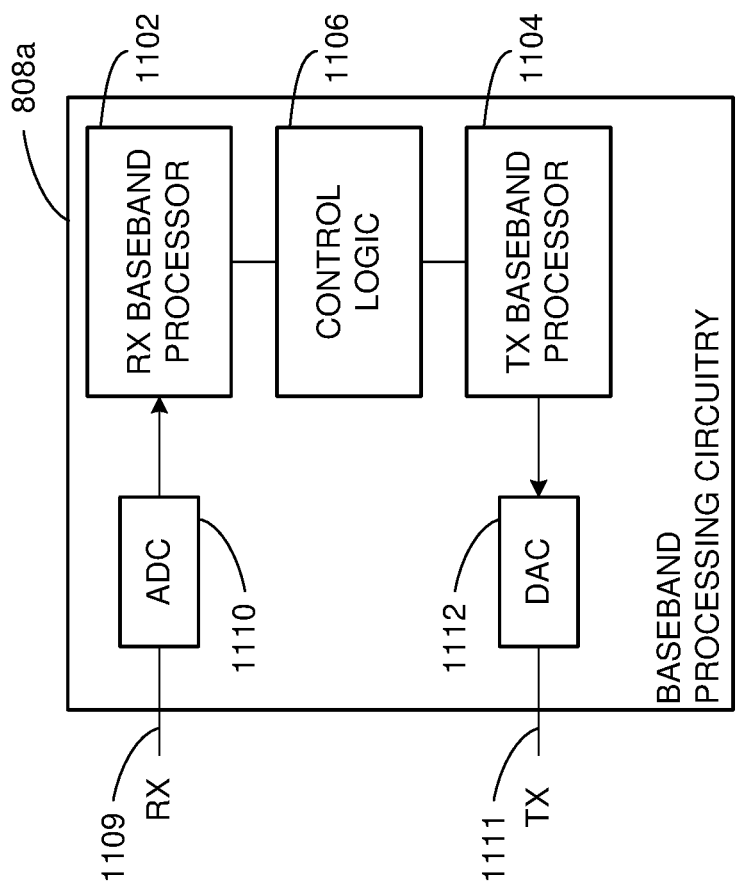
FIG. 11 illustrates an example baseband processing circuitry for use in the radio architecture of FIG. 8, in accordance with one or more example embodiments of the present disclosure.

FIG. 11 illustrates a functional block diagram of baseband processing circuitry 808*a* in accordance with some embodiments. The baseband processing circuitry 808*a* is one example of circuitry that may be suitable for use as the baseband processing circuitry 808*a* (FIG. 8), although other circuitry configurations may also be suitable. Alternatively, the example of FIG. 10 may be used to implement the example BT baseband processing circuitry 808*b* of FIG. 8.

The baseband processing circuitry 808*a* may include a receive baseband processor (RX BBP) 1102 for processing receive baseband signals 1009 provided by the radio IC circuitry 806*a-b* (FIG. 8) and a transmit baseband processor (TX BBP) 1104 for generating transmit baseband signals 1011 for the radio IC circuitry 806*a-b*. The baseband processing circuitry 808*a* may also include control logic 1106 for coordinating the operations of the baseband processing circuitry 808*a*.

In some embodiments (e.g., when analog baseband signals are exchanged between the baseband processing circuitry 808*a-b* and the radio IC circuitry 806*a-b*), the baseband processing circuitry 808*a* may include ADC 1110 to convert analog baseband signals 1109 received from the radio IC circuitry 806*a-b* to digital baseband signals for processing by the RX BBP 1102. In these embodiments, the baseband processing circuitry 808*a* may also include DAC 1112 to convert digital baseband signals from the TX BBP 1104 to analog baseband signals 1111.

In some embodiments that communicate OFDM signals or OFDMA signals, such as through baseband processor 808*a*, the transmit baseband processor 1104 may be configured to generate OFDM or OFDMA signals as appropriate for transmission by performing an inverse fast Fourier transform (IFFT). The receive baseband processor 1102 may be configured to process received OFDM signals or OFDMA signals by performing an FFT. In some embodiments, the receive baseband processor 1102 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 8, in some embodiments, the antennas 801 (FIG. 8) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 801 may each include a set of phased-array antennas, although embodiments are not so limited.

Although the radio architecture 105A, 105B is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

The following examples pertain to further embodiments.

Example 1 may include a device comprising processing circuitry coupled to storage, the processing circuitry configured to: cause to send a wake up receiver (WUR) beacon frame on a WUR beacon operating channel to one or more station devices; determine a first wake-up frame to be sent on a first WUR operating channel, wherein the first WUR operating channel may be associated with one or more frequency division multiple access (FDMA) channels used for transmitting one or more wake-up frames to the one or more station devices; determine to apply padding to the first wake-up frame based on a field included in a header of the first wake-up frame; and cause to send the first wake-up frame to a first station device of the one or more station devices.

Example 2 may include the device of example 1 and/or some other example herein, wherein the field may be a legacy signal (L-SIG) field of the header.

Example 3 may include the device of example 1 and/or some other example herein, wherein the processing circuitry may be further configured to determine to line up padding of the one or more wake-up frames based on an L-SIG length indication.

Example 4 may include the device of example 1 and/or some other example herein, wherein the first WUR operating channel may be different from the WUR beacon operating channel based on an indication by the first station device that it may be capable of performing a channel switch.

Example 5 may include the device of example 1 and/or some other example herein, wherein the first WUR operating channel may be same as the WUR beacon operating channel based on an indication by the first station device that it may be not capable of performing a channel switch.

Example 6 may include the device of example 1 and/or some other example herein, wherein a target time of transmitting the WUR beacon frame does not overlap with a duty cycle of the first station device.

Example 7 may include the device of example 1 and/or some other example herein, wherein a first padding may be added after the first wake-up frame.

Example 8 may include the device of example 7 and/or some other example herein, wherein a starting point of a transition delay may be from an end of the first wake-up frame and before the first padding.

Example 9 may include the device of example 1 and/or some other example herein, further comprising a transceiver configured to transmit and receive wireless signals, wherein the wireless signals are associated the one or more wake-up frames.

Example 10 may include the device of example 9 and/or some other example herein, further comprising an antenna coupled to the transceiver to cause to send the first wake-up frame.

Example 11 may include a non-transitory computer-readable medium storing computer-executable instructions which when executed by one or more processors result in performing operations comprising: causing to send a wake up receiver (WUR) beacon frame on a WUR beacon operating channel to one or more station devices; determining a first wake-up frame to be sent on a first WUR operating channel, wherein the first WUR operating channel may be associated with one or more frequency division multiple access (FDMA) channels used for transmitting one or more wake-up frames to the one or more station devices; determining to apply padding to the first wake-up frame based on a field included in a header of the first wake-up frame; and causing to send the first wake-up frame to a first station device of the one or more station devices.

Example 12 may include the non-transitory computer-readable medium of example 11 and/or some other example herein, wherein the field may be a legacy signal (L-SIG) field of the header.

Example 13 may include the non-transitory computer-readable medium of example 11 and/or some other example herein, wherein the operations further comprise determining to line up padding of the one or more wake-up frames based on an L-SIG length indication.

Example 14 may include the non-transitory computer-readable medium of example 11 and/or some other example herein, wherein the first WUR operating channel may be different from the WUR beacon operating channel based on an indication by the first station device that it may be capable of performing a channel switch.

Example 15 may include the non-transitory computer-readable medium of example 11 and/or some other example herein, wherein the first WUR operating channel may be same as the WUR beacon operating channel based on an indication by the first station device that it may be not capable of performing a channel switch.

Example 16 may include the non-transitory computer-readable medium of example 11 and/or some other example herein, wherein a target time of transmitting the WUR beacon frame does not overlap with a duty cycle of the first station device.

Example 17 may include the non-transitory computer-readable medium of example 11 and/or some other example herein, wherein a first padding may be added after the first wake-up frame.

Example 18 may include the non-transitory computer-readable medium of example 17 and/or some other example herein, wherein a starting point of a transition delay may be from an end of the first wake-up frame and before the first padding.

Example 19 may include a method comprising: causing to send, by one or more processors, a wake up receiver (WUR) beacon frame on a WUR beacon operating channel to one or more station devices; determining a first wake-up frame to be sent on a first WUR operating channel, wherein the first WUR operating channel may be associated with one or more frequency division multiple access (FDMA) channels used for transmitting one or more wake-up frames to the one or more station devices; determining to apply padding to the first wake-up frame based on a field included in a header of the first wake-up frame; and causing to send the first wake-up frame to a first station device of the one or more station devices.

Example 20 may include the method of example 19 and/or some other example herein, wherein the field may be a legacy signal (L-SIG) field of the header.

Example 21 may include the method of example 19 and/or some other example herein, further comprising determining to line up padding of the one or more wake-up frames based on an L-SIG length indication.

Example 22 may include the method of example 19 and/or some other example herein, wherein the first WUR operating channel may be different from the WUR beacon operating channel based on an indication by the first station device that it may be capable of performing a channel switch.

Example 23 may include the method of example 19 and/or some other example herein, wherein the first WUR operating channel may be same as the WUR beacon operating channel based on an indication by the first station device that it may be not capable of performing a channel switch.

Example 24 may include the method of example 19 and/or some other example herein, wherein a target time of transmitting the WUR beacon frame does not overlap with a duty cycle of the first station device.

Example 25 may include the method of example 19 and/or some other example herein, wherein a first padding may be added after the first wake-up frame.

Example 26 may include the method of example 27 and/or some other example herein, wherein a starting point of a transition delay may be from an end of the first wake-up frame and before the first padding.

Example 27 may include an apparatus comprising means for: causing to send a wake up receiver (WUR) beacon frame on a WUR beacon operating channel to one or more station devices; determining a first wake-up frame to be sent on a first WUR operating channel, wherein the first WUR operating channel may be associated with one or more frequency division multiple access (FDMA) channels used for transmitting one or more wake-up frames to the one or more station devices; determining to apply padding to the first wake-up frame based on a field included in a header of the first wake-up frame; and causing to send the first wake-up frame to a first station device of the one or more station devices.

Example 28 may include the apparatus of example 27 and/or some other example herein, wherein the field may be a legacy signal (L-SIG) field of the header.

Example 29 may include the apparatus of example 27 and/or some other example herein, further comprising means for determining to line up padding of the one or more wake-up frames based on an L-SIG length indication.

Example 30 may include the apparatus of example 27 and/or some other example herein, wherein the first WUR operating channel may be different from the WUR beacon operating channel based on an indication by the first station device that it may be capable of performing a channel switch.

Example 31 may include the apparatus of example 27 and/or some other example herein, wherein the first WUR operating channel may be same as the WUR beacon operating channel based on an indication by the first station device that it may be not capable of performing a channel switch.

Example 32 may include the apparatus of example 27 and/or some other example herein, wherein a target time of transmitting the WUR beacon frame does not overlap with a duty cycle of the first station device.

Example 33 may include the apparatus of example 11 and/or some other example herein, wherein a first padding may be added after the first wake-up frame.

Example 34 may include the apparatus of example 33 and/or some other example herein, wherein a starting point of a transition delay may be from an end of the first wake-up frame and before the first padding.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising processing circuitry coupled to storage, the processing circuitry configured to:
   cause to send a wake up receiver (WUR) beacon frame on a WUR beacon operating channel to one or more station devices;
   determine a first wake-up frame to be sent on a first WUR operating channel, wherein the first WUR operating channel is associated with one or more frequency division multiple access (FDMA) channels used for transmitting one or more wake-up frames to the one or more station devices determine a second wake-up fame to be sent on a second WUR operating channel different from the first WUR operating channel;
   set a legacy signal (L-SIG) indication to be the same for the first wake-up frame and the second wake-up frame;
   determine to apply a first padding to the first wake-up frame based on the L-SIG indication included in a header of the first wake-up frame;
   determine to apply a second padding to the second wake-up frame, wherein the first padding and second padding are used to align ends of the first wake-up frame and the second wake-up frame; and
   cause to send the first wake-up frame to a first station device of the one or more station devices.

2. The device of claim 1, wherein the processing circuitry is further configured to determine to line up padding of the one or more wake-up frames based on an L-SIG length indication.

3. The device of claim 1, wherein the first WUR operating channel is different from the WUR beacon operating channel based on an indication by the first station device that it is capable of performing a channel switch.

4. The device of claim 1, wherein the first WUR operating channel is same as the WUR beacon operating channel based on an indication by the first station device that it is not capable of performing a channel switch.

5. The device of claim 1, wherein a target time of transmitting the WUR beacon frame does not overlap with a duty cycle of the first station device.

6. The device of claim 1, wherein a first padding is added after the first wake-up frame.

7. The device of claim 6, wherein a starting point of a transition delay is from an end of the first wake-up frame and before the first padding.

8. The device of claim 1, further comprising a transceiver configured to transmit and receive wireless signals, wherein the wireless signals are associated the one or more wake-up frames.

9. The device of claim 8, further comprising an antenna coupled to the transceiver to cause to send the first wake-up frame.

10. A non-transitory computer-readable medium storing computer-executable instructions which when executed by one or more processors result in performing operations comprising:
   causing to send a wake up receiver (WUR) beacon frame on a WUR beacon operating channel to one or more station devices;
   determining a first wake-up frame to be sent on a first WUR operating channel, wherein the first WUR operating channel is associated with one or more frequency division multiple access (FDMA) channels used for transmitting one or more wake-up frames to the one or more station devices;
determining a second wake-up fame to be sent on a second WUR operating channel different from the first WUR operating channel;
setting a legacy signal (L-SIG) indication to be the same for the first wake-up frame and the second wake-up frame;
determining to apply a first padding to t pickup he first wake-up frame based on the L-SIG indication included in a header of the first wake-up frame;
determining to apply a second padding to the second wake-up frame, wherein the first padding and the second padding are used to alignment ends of the first wake-up frame and the second wake-up frame; and
causing to send the first wake-up frame to a first station device of the one or more station devices.

11. The non-transitory computer-readable medium of claim 10, wherein the operations further comprise determining to line up padding of the one or more wake-up frames based on an L-SIG length indication.

12. The non-transitory computer-readable medium of claim 10, wherein the first WUR operating channel is different from the WUR beacon operating channel based on an indication by the first station device that it is capable of performing a channel switch.

13. The non-transitory computer-readable medium of claim 10, wherein the first WUR operating channel is same as the WUR beacon operating channel based on an indication by the first station device that it is not capable of performing a channel switch.

14. The non-transitory computer-readable medium of claim 10, wherein a target time of transmitting the WUR beacon frame does not overlap with a duty cycle of the first station device.

15. The non-transitory computer-readable medium of claim 10, wherein a first padding is added after the first wake-up frame.

16. The non-transitory computer-readable medium of claim 15, wherein a starting point of a transition delay is from an end of the first wake-up frame and before the first padding.

17. A method comprising:
causing, by one or more processors, to send a wake up receiver (WUR) beacon frame on a WUR beacon operating channel to one or more station devices;
determining a first wake-up frame to be sent on a first WUR operating channel, wherein the first WUR operating channel is associated with one or more frequency division multiple access (FDMA) channels used for transmitting one or more wake-up frames to the one or more station devices;
determining a second wake-up fame to be sent on a second WUR operating channel different from the first WUR operating channel;
setting a legacy signal (L-SIG) indication to be the same for the first wake-up frame and the second wake-up frame;
determining to apply a first padding to the first wake-up frame based on a field the L-SIG indication included in a header of the first wake-up frame;
determining to apply a second padding to the second wake-up frame, wherein the first padding and the second padding are used to alignment ends of the first wake-up frame and the second wake-up frame; and
causing to send the first wake-up frame to a first station device of the one or more station devices.

\* \* \* \* \*